(12) United States Patent
Mancini (10) Patent No.: US 8,007,613 B2
(45) Date of Patent: Aug. 30, 2011

(54) METHOD AND APPARATUS FOR MANUFACTURING TYRES

(75) Inventor: Gianni Mancini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1038 days.

(21) Appl. No.: 11/662,958

(22) PCT Filed: Sep. 20, 2004

(86) PCT No.: PCT/IT2004/000509
§ 371 (c)(1),
(2), (4) Date: Jul. 26, 2007

(87) PCT Pub. No.: WO2006/033119
PCT Pub. Date: Mar. 30, 2006

(65) Prior Publication Data
US 2007/0267125 A1    Nov. 22, 2007

(51) Int. Cl.
*B29D 30/10* (2006.01)
*B29D 30/12* (2006.01)

(52) U.S. Cl. ........ 156/117; 156/126; 156/130; 156/133; 156/397; 156/415; 156/416; 425/43; 425/52

(58) Field of Classification Search .................. 156/117, 156/126, 130, 130.5, 133, 396, 397, 406.2, 156/415, 416; 425/43, 52
See application file for complete search history.

(56) References Cited

U.S. PATENT DOCUMENTS

| 3,380,872 A | 4/1968 | Pouilloux |
| 3,767,509 A * | 10/1973 | Gazuit .......................... 156/415 |
| 3,909,337 A | 9/1975 | Yabe |
| 4,144,114 A * | 3/1979 | Enders .......................... 156/414 |
| 4,288,265 A * | 9/1981 | Pacciarini et al. ............. 156/126 |
| 4,325,764 A * | 4/1982 | Appleby et al. ............... 156/123 |
| 4,877,468 A | 10/1989 | Siegenthaler |
| 5,322,587 A | 6/1994 | Kondo et al. |
| 5,354,399 A * | 10/1994 | Nishide ......................... 156/133 |

(Continued)

FOREIGN PATENT DOCUMENTS

EP        0 613 767 A2    9/1994

(Continued)

OTHER PUBLICATIONS

Bridgestone Corp., "Method and Apparatus for Manufacturing Pneumatic Tire", Patent Abstracts of Japan, JP No. 2002 046193, Feb. 12, 2002.

*Primary Examiner* — Geoffrey L Knable (74) *Attorney, Agent, or Firm* — Finnegan, Henderson, Farabow, Garrett & Dunner, L.L.P.

(57) ABSTRACT

The constituent elements of a carcass structure of a tire are formed by laying elementary components on a building support including an inflatable bladder set in an inflated condition in which it substantially reproduces the inner configuration of the carcass structure to be obtained. A belt structure carrying a tread band, both produced separately, is coaxially disposed around the carcass structure formed on the building support and applied thereto following a radial expansion of the inflatable bladder. In a vulcanization mold, the building support is submitted to an over-inflation step to press the tire against the inner walls of the mold. The circumferential edges of the inflatable bladder are in engagement with respective anchoring flanges with possibility of movement in a radial direction, so as to be submitted to an elastic expansion during the over-inflation step.

50 Claims, 8 Drawing Sheets

U.S. PATENT DOCUMENTS

| | | |
|---|---|---|
| 5,413,653 A | 5/1995 | Kondo et al. |
| 5,853,526 A | 12/1998 | Laurent et al. |
| 6,318,432 B1 | 11/2001 | Caretta et al. |
| 6,457,504 B1 | 10/2002 | Caretta |
| 6,635,132 B2 | 10/2003 | Caretta et al. |
| 2002/0029841 A1 | 3/2002 | Caretta et al. |
| 2002/0062908 A1 | 5/2002 | Mancini et al. |
| 2002/0153081 A1* | 10/2002 | Caretta ................ 152/548 |
| 2004/0177914 A1* | 9/2004 | Girard et al. ............ 156/133 |

FOREIGN PATENT DOCUMENTS

| | | |
|---|---|---|
| GB | 1032394 | 6/1966 |
| WO | WO 92/08602 | 5/1992 |
| WO | WO 01/32409 | 5/2001 |
| WO | WO 03/053662 A1 | 7/2003 |
| WO | WO 2006/033120 A1 | 3/2006 |

* cited by examiner

METHOD AND APPARATUS FOR MANUFACTURING TYRES

CROSS REFERENCE TO RELATED APPLICATION

This application is a national phase application based on PCT/IT2004/000509, filed Sep. 20, 2004, the content of which is incorporated herein by reference.

BACKGROUND OF THE INVENTION

1. Field of the Invention

The present invention relates to an apparatus for manufacturing tyres, and to a method of manufacturing tyres put into practice by said apparatus.

2. Description of the Related Art

The main constituent elements of a tyre generally comprise a carcass structure including at least one carcass ply having end flaps engaged with respective annular anchoring structures, said anchoring structures being each usually formed of a substantially circumferential annular insert currently referred to as bead core, to which, at a radially external position, at least one filling insert is applied.

Associated with the carcass structure is a belt structure comprising one or more belt layers, disposed in radial superposition with respect to each other and to the carcass ply and having textile or metallic reinforcing cords with a crossed orientation and/or substantially parallel to the circumferential extension direction of the tyre. Applied to the belt structure at a radially external position is a tread band of elastomer material in which a raised pattern for tyre contact with the ground is formed.

It is to be pointed out, to the aims of the present description that by the term "elastomer material" it is intended a composition comprising at least one elastomeric polymer and at least one reinforcing filler. Preferably this composition further comprises additives such as a cross-linking agent and/or a plasticizer. Due to the presence of the cross-linking agent, this material can be cross-linked through heating, so as to form the final article of manufacture. In addition, respective sidewalls of elastomer material are applied to the side surfaces of the carcass structure, each extending from one of the side edges of the tread band until close to the respective annular anchoring structure to the beads.

The carcass structure and belt structure, together with the respective tread band, can be made separately from each other in respective work stations, to be mutually assembled at a later time.

According to conventional manufacturing methods, the tread band and sidewalls are made each from a continuously extruded section member that, after cooling for stabilising its geometrical conformation, is stored on suitable tables or reels. The semifinished product in the form of sections or a continuous strip is then sent to a feeding unit the task of which is to pick up the sections or cut the continuous strip into sections of predetermined length, each of them constituting the tread band or one of the sidewalls to be circumferentially applied to the tyre under working.

As described in document U.S. Pat. No. 3,380,872, the carcass plies and annular anchoring structures of a tyre are assembled on a reference support comprising a membrane having circumferential edges in engagement with respective opposite circular flanges keeping the membrane taut in a cylindrical conformation. When assembling of the carcass structure is completed, compressed air is admitted into the membrane to radially expand it and give it a toroidal conformation. Should the conformation be insufficient, the opposite flanges can be mutually approached. The other constituent elements of the tyre, such as the belt structure, tread band and sidewalls, can be applied to the carcass structure thus formed. The manufactured tyre is then removed from the reference support to be subsequently vulcanised.

Document U.S. Pat. No. 5,853,526 discloses formation of the green tyre through assembly of its constituent elements using an inflatable bladder as the reference support, said bladder being inflated to a predetermined pressure and being subsequently introduced into a vulcanisation mould together with the green tyre formed on said support.

In accordance with documents U.S. Pat. No. 6,318,432, U.S. Pat. No. 6,635,132 and US 2002-029841 in the name of the same Applicant, each constituent element of the tyre is formed through direct application on a toroidal rigid building support of one or more elementary components such as elongated elements or strips of elastomer material, rubberised metallic or textile cords, strip-like elements of rubberised cords, or others, so as to enable manufacture of tyres without requiring that a plurality of semifinished products be manufactured and stored.

SUMMARY OF THE INVENTION

The Applicant realised that generally, in the production plants of the conventional type the production lines for the belts and/or the tread band, and in particular the equipment associated therewith for manufacture of the semifinished products are conceived and structured for a high production capacity that is usually in excess with respect to the production capacity of the equipment designed to handle the semifinished products for formation of the belt structures, and/or of the carcass structure manufacturing lines.

To the aims of the present description, by "production plant of the conventional type" it is intended a production plant in which the tyre is obtained through assembling of a plurality of semifinished products (e.g. liners, carcass plies, bead cores, sidewalls, belt structure, tread band) made separately in distinct work stations with respect to the manufacturing line of the tyre.

Starting from the above remark, the Applicant has perceived the possibility of increasing exploitation of the unsaturated production plants of the conventional type and therefore increasing the overall production capacity of said plants by integrating into these conventional lines, production steps contemplating manufacture of the carcass structure through laying of elementary components on a rigid toroidal support.

In other words, the Applicant has perceived the possibility of increasing the production capacity of a plant of the conventional type by implementing saturation of the production lines of the belts and/or the tread band, and/or the equipment interlocked with the latter for the supply of semifinished products, by integrating the plant itself with stations carrying out the manufacture of carcass structures through laying of elementary components on a toroidal support, said elementary components consisting of strip-like elements of elastomeric material alone, or strip-like elements of elastomer material incorporating reinforcing elements (generally textile or metallic cords), rubberised cords or rubberised metallic wires.

In accordance with the present invention, the Applicant has found that in a tyre manufacturing plant in which the carcass structures are made of elementary components, the presence of a building support comprising an expandable bladder can be advantageously utilised for application to the carcass structure of a belt structure and possibly a tread band, previously made as semifinished products in an annular form.

In addition, the Applicant has become aware of the fact that if a belt structure already obtained as a semifinished product of annular form is applied to the carcass structure—made of elementary components—stresses due to formation of the belt structure through application of strips directly on the carcass structure are avoided to the inflatable bladder. Therefore it is advantageously possible to use an inflatable bladder that is less rigid and consequently more adapted to be expanded without too many difficulties.

In more detail, it is an object of the present invention to provide an apparatus for manufacturing tyres, comprising: a building support including an inflatable bladder having coaxially spaced apart circumferential edges; inflating devices associated with the inflatable bladder to bring it to an inflated condition in which it has a substantially toroidal shape with an outer surface thereof conforming in shape to the inner surface of a carcass structure of a tyre; devices for forming the carcass structure by laying elementary components of said carcass structure on the building support; devices for applying an annular belt structure to the carcass structure, at a radially external position; wherein said devices for applying the belt structure comprise: positioning devices operating on the belt structure to support it at a coaxially centred position around the carcass structure formed on the building support; devices for expanding the inflatable bladder from the inflated condition, at which the carcass structure formed thereon has a maximum diameter smaller than an inner diameter of the belt structure, to a radial-expansion condition at which the carcass structure is applied against the belt structure.

Thus it is possible to apply an annular belt structure to a carcass structure made through laying of elementary components without being obliged to remove the carcass structure from the support element used for building it.

In accordance with a further aspect of the present invention, said apparatus is integrated into a plant for manufacturing tyres, comprising: a carcass-assembling line comprising devices for forming assembled carcass structures through laying of semifinished components on an assembling support; a carcass-building line comprising devices for forming built carcass structures through laying of elementary components on a building support; a belt manufacturing line; devices for belt application designed to apply an annular belt structure manufactured in said belt-manufacturing line, at a radially external position, to each of said assembled carcass structures and built carcass structures; a work station in which tread bands are supplied at a radially external position to said annular belt structures; and a vulcanisation and moulding station for the thus obtained tyres.

It is a still further object of the present invention to provide a method of manufacturing tyres through use of a building support having an inflatable bladder with coaxially spaced apart circumferential edges, said method comprising the steps of: setting the inflatable bladder to an inflated condition so that an outer surface thereof conforms in shape to the inner surface of a carcass structure of a tyre; applying a plurality of elementary components onto the building support so as to form the carcass structure; applying an annular belt structure to the carcass structure, at a radially external position; wherein application of the belt structure comprises the steps of: making the belt structure; arranging the belt structure at a coaxially centred position relative to the carcass structure formed on the inflatable bladder; radially expanding the inflatable bladder to apply the carcass structure against the belt structure.

In a further independent inventive aspect, the above method is put into practice within the scope of a tyre manufacturing process comprising the steps of: applying semifinished components onto a carcass-assembling support so as to form assembled carcass structures; applying a plurality of elongated elementary components onto a carcass-building support so as to form built carcass structures; manufacturing annular belt structures in a belt manufacturing line; applying at least one of said belt structures at a radially external position to each of said assembled carcass structures and built carcass structures; associating a tread band with each annular belt structure at a radially external position, and vulcanising and moulding the thus obtained tyres.

BRIEF DESCRIPTION OF THE DRAWINGS

Further features and advantages will become more apparent from the detailed description of a preferred but not exclusive embodiment of a manufacturing apparatus adapted to put said method into practice.

This description will be set out hereinafter with reference to the accompanying drawings given by way of non-limiting example, in which.

DETAILED DESCRIPTION OF THE INVENTION

With reference to the drawings, a plant integrating an apparatus for manufacturing tyres for vehicle wheels in accordance with the present invention has been generally identified by reference numeral 1.

Plant 1 is dedicated to the manufacture of tyres 2 essentially comprising (see in particular FIG. 5) a carcass structure 3 including: at least one carcass ply 4, internally coated with a layer of an airtight elastomer material or a so-called "liner" 4a; and two annular anchoring structures 5a in engagement with the circumferential edges of the carcass structure 3 close to the regions usually identified with the name of "beads" 5. Tyre 2 further comprises a belt structure 6 circumferentially applied to the carcass ply 4, a tread band 7 circumferentially superposed on the belt structure 6 and two sidewalls 8 applied to the carcass ply 4 at laterally opposite positions and each extending from the corresponding bead 5 to the corresponding side edge of the tread band 7.

Figure 5:
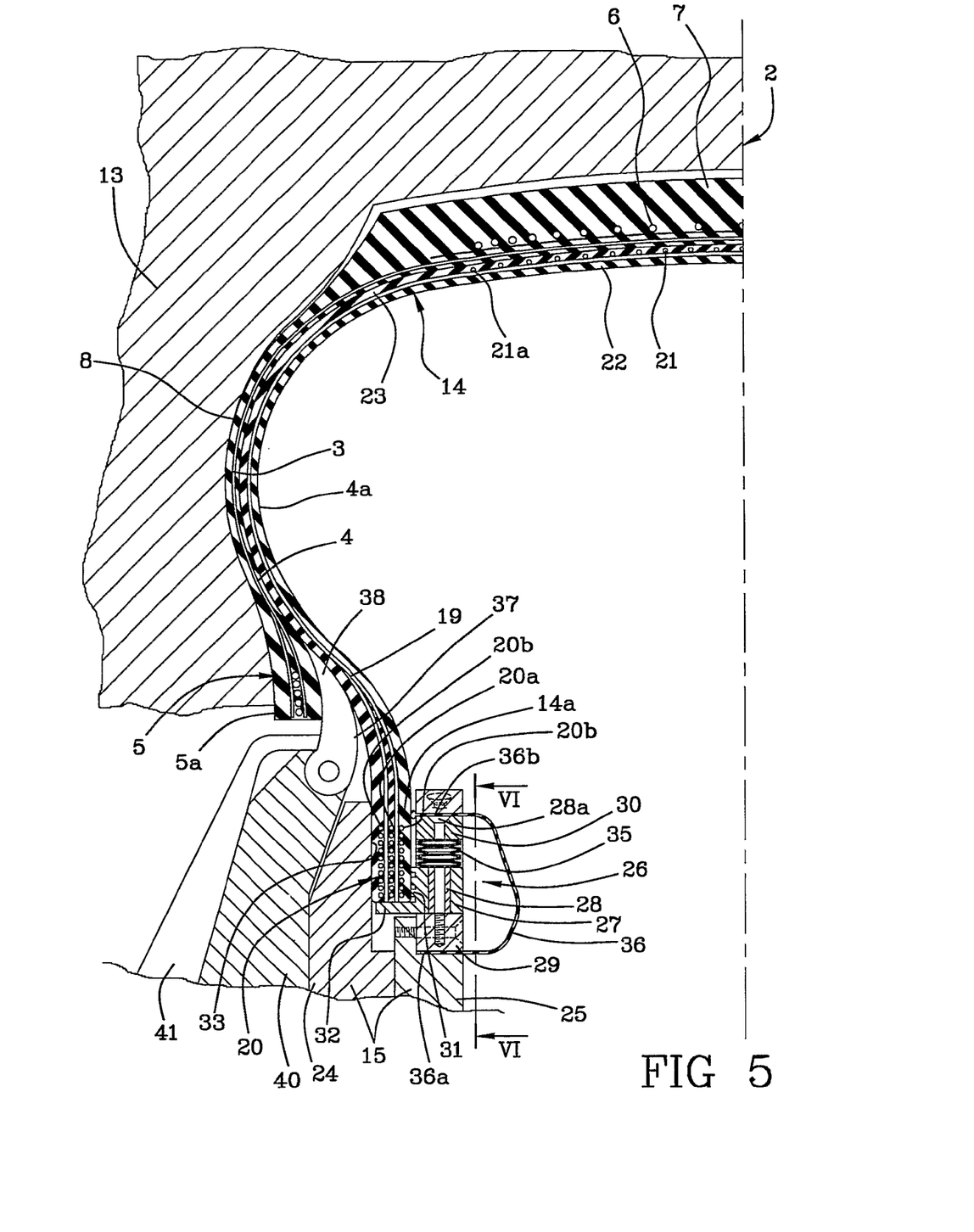
FIG. 5 shows a detail to an enlarged scale of the building support with the manufactured tyre, within a vulcanisation mould.

Preferably, the belt structure 6 comprises at least two radially superposed layers formed of a rubberised fabric provided with usually-metallic reinforcing cords disposed parallel to each other in each layer and in crossed relationship relative to the cords of the adjacent layer, preferably arranged in a symmetric manner with respect to the equatorial plane of the tyre, said at least two layers forming the so-called "crossed layers" of the belt structure. Preferably, also associated with the belt structure 6, at a position radially external to the two above mentioned layers, is a layer of textile or metallic cords disposed in a substantially circumferential direction, said cords being defined by at least one elongated element wound up into circumferential coils disposed in axial side by side relationship at a position radially external to the underlying belt layers mentioned above. Said further layer forms the so-called "zero-degree layer" of the belt structure.

Figure 1:
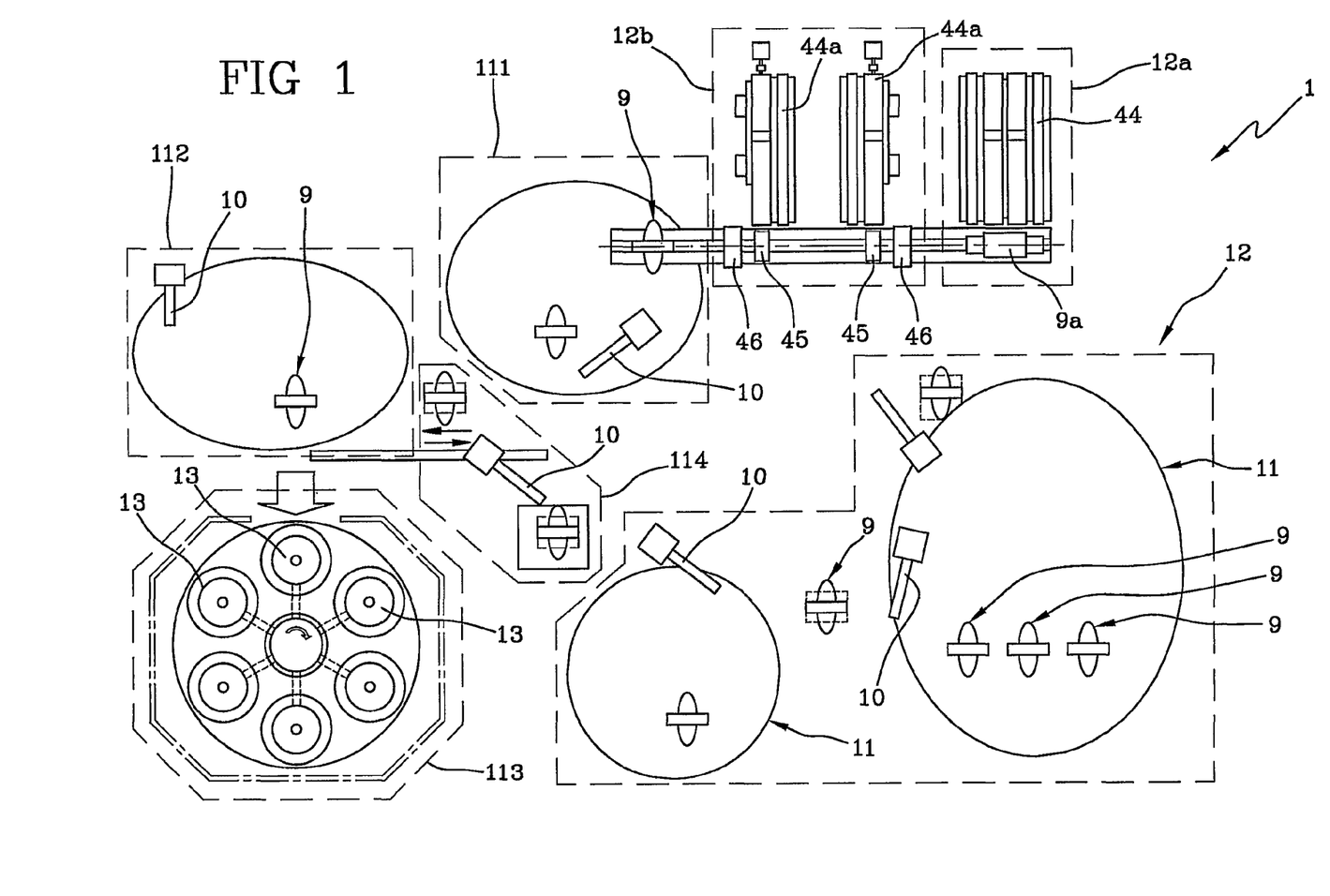
FIG. 1 is a diagrammatic plan view of a plant for tyre production integrating an apparatus in accordance with the present invention.

The plant 1 for manufacturing tyres 2 comprises at least one carcass-assembling line of the conventional type, generally denoted at 12a, dedicated to the manufacture of carcass structures 3 obtained through assembling of semifinished components. In the present specification, the carcass structures 3 obtained on the assembling line are identified as "assembled carcasses".

The assembling line 12a essentially comprises a carcass-assembling support 9a consisting of a drum for example that is suitable for manufacturing the assembled carcass structures 3 following a known process usually called "unistage process". Alternatively, the assembling support 9a can be combined with a shaping drum (not shown) to make assembled carcass structures 3 following a manufacturing process of the type called "two-stage process".

The assembling support 9a is interlocked with one or more feeding lines 44 entrusted with the task of supplying semifinished components for obtaining the assembled carcass structures 3, such as the carcass plies 4, annular reinforcing elements 5a, possibly the sidewalls 8 and/or other components, that are obtained from semifinished products coming from the preceding working and storage steps.

Plant 1 further comprises at least one carcass-building line generally denoted at 12 in FIG. 1, dedicated to obtaining carcass structures 3 built by means of elementary components. In the course of the present specification, the carcass structures 3 obtained on the building line 12 are identified as "built carcasses" for the only purpose of distinguishing them from the "assembled carcasses" obtained along the assembling line 12a.

The building line 12 comprises one or more carcass-building supports 9 each of which, through one or more robotized arms 10 or other transfer devices, is sequentially brought to interact with one or more manufacturing stations 11 located along the building line 12 to cause manufacture of built carcass structures 3, through production and assembly of the above listed constituent elements 3, 4, 4a, 5, 8, following a predetermined sequence.

The manufacturing plant 1 further comprises at least one conventional belt-manufacturing line 12b of the type usually combined with the assembling line 12a carrying out formation of the assembled carcass structures 3 in a conventional manner. This belt-manufacturing line 12b comprises devices for applying the belt structure 6 at a radially external position to each of said assembled carcass structures and built carcass structures 3 coming from the carcass-assembling line 12a and the carcass-building line 12, respectively. The devices for belt application will be described in more detail in the following, referring particularly to the interaction of same with the carcass-building line 12, while they will not be described in detail as regards their interaction with the assembling line 12a, as the latter can be made in a manner known by itself.

In accordance with the embodiment shown in FIG. 1, the manufacturing plant 1 comprises a work station 111 in which the built carcass structure 3 obtained in the building line 12 is coupled (as better described in the following) with the belt structure 6 obtained in the belt-manufacturing line 12b.

In addition, in accordance with the embodiment shown in FIG. 1, the manufacturing plant 1 comprises a work station 112 in which a tread band 7 is applied at a radially external position to the belt structure 6, as better detailed in the following of the present specification.

When manufacture of a tyre has been completed, each green tyre 2, with the aid of one of the robotized arms 10 for example, or other suitable transfer device, is transferred to a vulcanisation and moulding station 113 comprising one or more moulds 13 to carry out vulcanisation of tyre 2.

Figure 2:
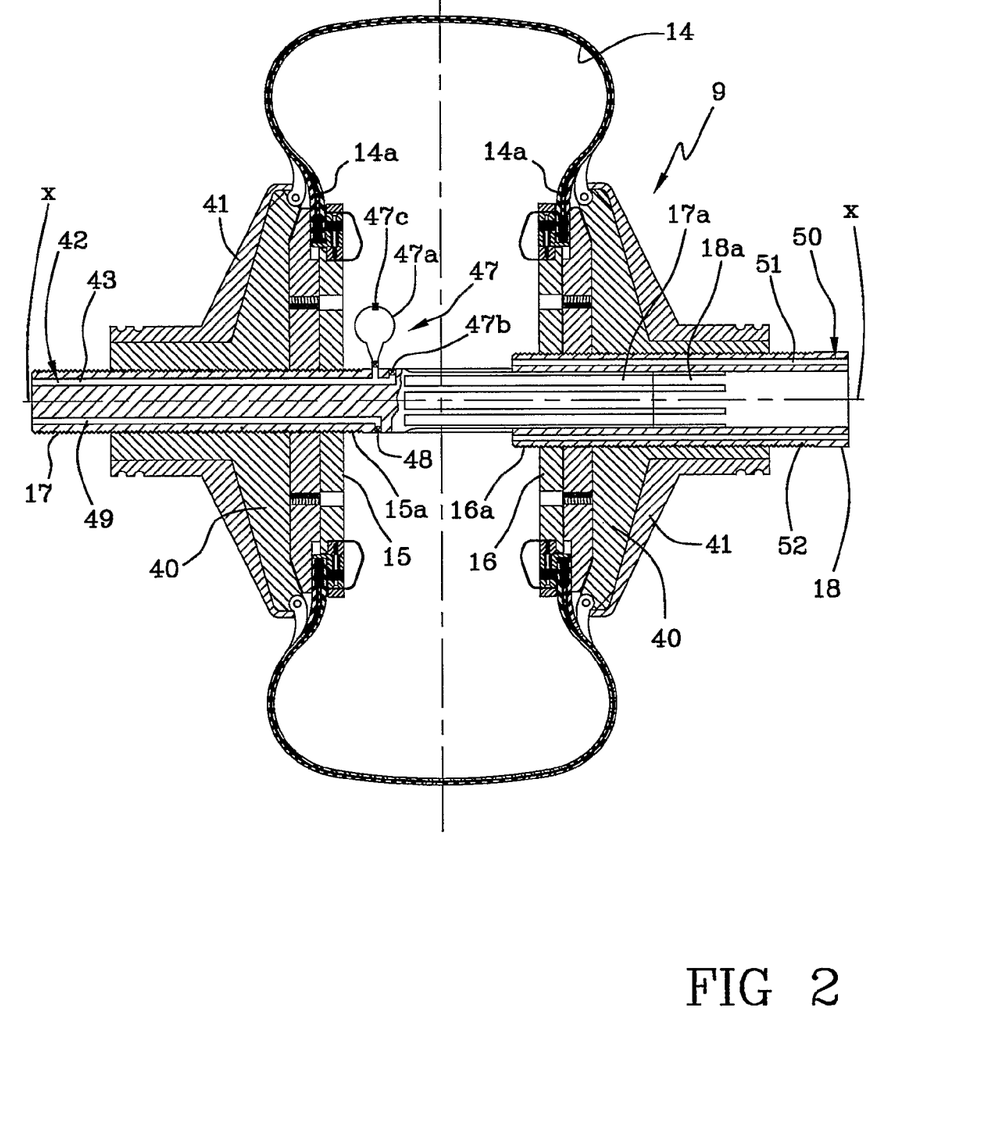
FIG. 2 diagrammatically shows a carcass-building support being part of the apparatus in reference, in a diametrical section, with the inflatable bladder in an inflated condition.

Each of the building supports 9 used along the carcass-building line 12, as well as in the above mentioned stations 111 and 112 and possibly also in the vulcanisation and moulding station 113, essentially comprises an inflatable bladder 14 having axially spaced apart circumferential edges that are in engagement with a first and a second anchoring flanges 15, 16, respectively. The first and second anchoring flanges 15, 16 are fastened to a first and a second shafts 17, 18 respectively, that are in telescopic relationship with each other. For the purpose, the first shaft 17 can be for example provided to be coaxially insertable in the second shaft 18 that is internally hollow, by means of a splined joint 17a, 18a making them rigidly connected during rotation. A locking member not shown, comprising a mechanical hooking to be operated mechanically, electromagnetically, pneumatically or in a different manner for example, ensures a steady axial locking between the first and second shafts 17, 18, with possibility of releasing them from each other, for purposes better specified in the following.

Advantageously, engagement of at least one of the anchoring flanges 15, 16 with the respective shaft 17, 18 can take place by screwing. In a preferential solution both flanges 15, 16 are fastened on the respective first and second shafts by means of first and second threads 15a, 16a respectively having respectively opposite screwing directions. Due to the above, a mutual axial movement of the anchoring flanges 15, 16 can be caused by imparting a rotation to shafts 17, 18.

Preferably, the inflatable bladder 14 has a radial reinforcing structure 19 made up of textile or metallic cords disposed in planes radial to a geometrical rotation axis X-X, and each extending between the opposite circumferential edges 14a of the inflatable bladder itself. Formed in the vicinity of each circumferential edge 14a is an annular anchoring structure 20 comprising annular inserts 20a, 20b each consisting of one or more textile or metallic cords wound up to form radially superposed coils. In the embodiment shown, integrated into each circumferential edge 14a of the inflatable bladder 14 is a central annular insert 20a interposed between two rows of cords belonging to the radial reinforcing structure 19 and in superposed relationship in an alternated sequence on the axially inner and axially outer side respectively of the central insert itself. Also provided are two side inserts 20b disposed respectively at an axially inner and axially outer position with respect to the cords of the radial reinforcing structure 10.

Associated with the radial reinforcing structure 19 is a belting structure 21 comprising one or more textile or metallic cords, circumferentially wound up to form coils disposed close to each other externally of the radial reinforcing structure 10, at a region confined between two axially opposite edges 21a of the belting structure, suitably spaced apart from the circumferential edges 14a of the inflatable bladder 14.

The belting structure 21 can consist of one or more cords comprising 2 to 5 metal filaments with a diameter included between 0.08 mm and 0.3 mm. The cord or cords can form coils disposed with a thickness included between 50 and 135 cords/dm. Each cord preferably has an ultimate strength included between 250 and 550 Newtons, with elongation of 0.5% for a strength included between $\frac{1}{7}$ and $\frac{1}{8}$ of the ultimate strength.

In a preferential solution, the radial reinforcing structure 19 is made up of metallic cords distributed with a thickness included between 50 and 180 cords/dm and each comprising two to five filaments of steel having a diameter included between 0.06 mm and 0.2 mm. Each cord has an ultimate strength included between 45 and 165 Newtons, with an elongation of 0.5% for a strength included between $\frac{1}{3}$ and $\frac{1}{5}$ of the ultimate strength.

Each annular reinforcing insert 20a, 20b can in turn be formed of a cord comprising 2 to 12 metallic filaments having a diameter included between 0.2 mm and 0.45 mm. The ultimate strength of the cord is preferably included between 550 and 1850 Newtons, with an elongation corresponding to 0.5% for a strength included between $\frac{1}{6}$ and $\frac{1}{7}$ of the ultimate strength.

The reinforcing inserts can be integrated, together with the ends of the cords forming the radial reinforcing structure, into high-modulus elastomeric fillers with a hardness just as an indication in the order of 70° and 92° Shore A, arranged close to the end edges 14a of the inflatable bladder 14.

The inflatable bladder 14 is also provided to be preferably coated on its inner surface with a layer of highly impermeable elastomer material 22, a butyl-based blend for example. The outer surface of the inflatable bladder 14 on the contrary is preferably coated with a layer of unsticky material 23, a silicone-based blend or PTFE (polytetrafluoroethylene) for example.

Since the process in accordance with the present invention comprises the step of manufacturing the belt structure 6 of a tyre, or at least part of said belt structure, in a production line 12b of the conventional type, the structure of the inflatable bladder 14 of the building support 9 is not required to be able to withstand the stresses resulting from the step of laying the belt structure 6 (said belt structure being in fact made in a conventional separated line and, therefore not directly on the inflatable bladder referred to above). Therefore this enables accomplishment of an inflatable bladder having a simplified structure as compared with that which has been previously illustrated.

In addition, by virtue of the fact that the process in accordance with the invention uses a building support 9 comprising an inflatable bladder 14, it is possible to disengage the green tyre 2 from the support itself, if the vulcanisation step is wished to be conducted in a conventional line, i.e. without introducing said support into the vulcanisation mould.

Figure 8:
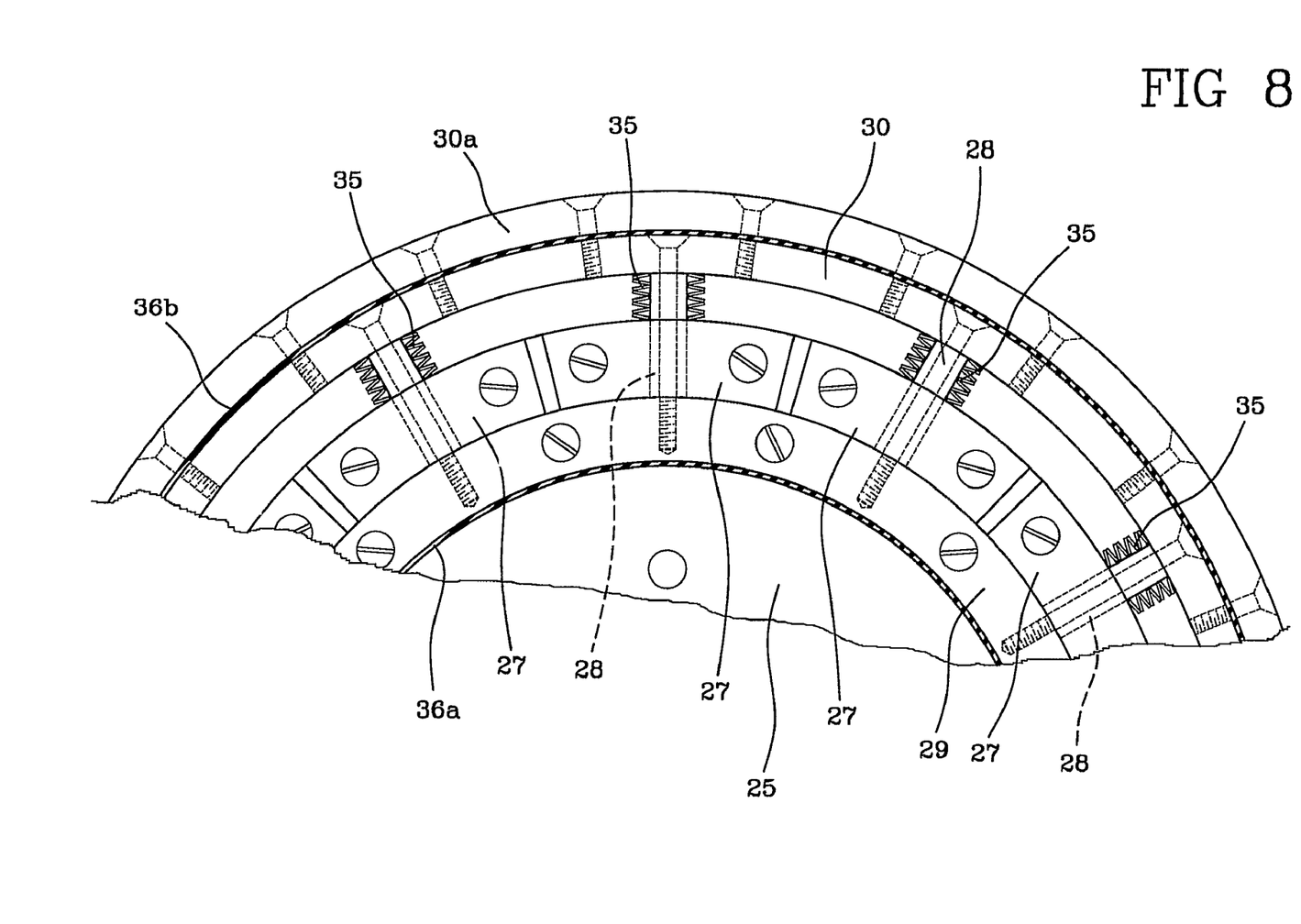
FIG. 8 partly shows one of the anchoring flanges of the carcass-building support, sectioned along line VI-VI in FIG. 5.

Each of the anchoring flanges 15, 16 comprises an axially external flange half 24 and an axially internal flange half 25 incorporating radial-sliding members 26 engaging the corresponding circumferential edge 14a of the inflatable bladder 14 in such a manner that the circumferential edge is movable in a radial direction.

In more detail, the radial-sliding members 26 contemplate the arrangement of a plurality of circumferentially distributed blocks 27 in the vicinity of the perimetral edge of at least one of the flange halves 24, 25, in the case herein illustrated on the axially internal flange half 25. Each block 27 is slidably guided in a radial direction along at least one guide element 28 extending through the block itself and rigidly engaged between a first circumferential ring 29 and a second circumferential ring 30 that are concentric and fastened to the axially internal flange half 25 by means of screws 28a longitudinally passing through the guide elements 28 associated with the different blocks 27, for example.

Each block 27 has a grip surface 31 acting in thrust relationship against the surface of the inflatable bladder 14 close to its inner circumferential edge 14a, and an abutment lug 32 jutting out in an axial direction to supply a further rest seat to said inner circumferential edge.

The grip surface 31 is preferably provided with ribs extending in a substantially circumferential direction to efficiently retain the inflatable bladder 14 and thus prevent slipping off of the same in a radial direction relative to the block 27.

The circumferentially distributed blocks 27 act in thrust relationship against the circumferential edge 14a of the inflatable bladder 14, against the action of a radial abutment surface 33 formed in the axially external flange half 24. In other words, each of the circumferential edges 14a of the inflatable bladder 14 is enclosed between the blocks 27 carried by the axially internal flange half 25 and the radial abutment surface 33 formed on the axially external flange half 24.

The first and second anchoring flanges 15, 16 are preferably provided to be each associated with at least one circumferential seal 34 set to act against the inflatable bladder 14 to hermetically isolate the inner part thereof from the external environment. This circumferential seal can be placed, for example, at the second circumferential ring 30, radially external to the first circumferential ring 29 and can possibly extend towards the geometrical axis X-X, to act in sliding-contact relationship against the inner surface of the inflatable bladder 14. The outer surface of the inflatable bladder 14 can be also slidably and sealingly engaged against the radial abutment surface 33 formed on the axially external flange half 24, upon possible interposition of a second circumferential seal (not shown). The radial abutment surface 33 can be coated with a layer of antifriction material, Teflon® for example.

Elastic return members 35, consisting of Belleville washers fitted on the elements 28 for example, constantly urge each block 27 towards the geometric axis X-X of the inflatable bladder 14.

It may be also provided that an annular membrane 36 should be associated with each anchoring flange 15, 16; said annular membrane 36 has a radially internal circumferential edge 36a and a radially external circumferential edge 36b sealingly fastened to the anchoring flange at a radially external and radially internal positions relative to the radial sliding members 26, respectively. In particular, the radially internal edge 36a of the annular membrane 36 can be sealingly enclosed between the axially internal flange half 25 and the first circumferential ring 29, while the radially external edge 36b can be enclosed between the second circumferential ring 30 and a third circumferential ring 30a fastened to the second ring 30. Said circumferential seal 34 can be formed on the end of the radially external edge 36b of the annular membrane 36.

Combined with each of the anchoring flanges 15, 16 is an annular abutment flange 37 to be positioned against an outer side surface of the inflatable bladder 14, to supply a rest surface to the inner surface of tyre 2 close to a respective bead 5 of said tyre. Each of these annular abutment flanges 37 is divided into a plurality of circumferential sectors 38, 39 that are each movable between an operating position at which they have a substantially radial orientation relative to the geometrical axis X-X of the inflatable bladder 14, and a rest position at which they are radially retracted to allow disengagement of the tyre 2 from the building support 9.

In more detail, first circumferential sectors 38 and second circumferential sectors 39 are provided, said sectors being distributed in an alternated sequence and being engaged with a first hub 40 and a second hub 41 respectively, that are axially movable with respect to each other and can be positioned in an approached relationship with the respective anchoring flange 15, 16. The first hub 40 of each anchoring flange 15, 16 is preferably engaged by screwing on the first shaft 17 or on the second shaft 18 respectively, so that, when it abuts against the respective anchoring flange 15, 16, rotational locking of said flange relative to the corresponding shaft 17, 18 is caused.

The second hub 41 can be axially approached relative to the first hub 40 so that it lends itself to interpose the second circumferential sectors 39 between the first circumferential sectors 38 carried by the first hub 40, in a surface continuity relationship therewith.

Torsion springs or other suitable elastic members operate between each circumferential sector 38, 39 and the corresponding hub 40, 41 to keep the circumferential sectors in the operating condition.

Also associated with the inflatable bladder 14 are inflating devices 42 to admit fluid under pressure into said bladder and make it have such an inflated condition that it becomes of a substantially toroidal shape with an outer surface conforming in shape to the inner surface of the green tyre 2 to be manufactured. These inflating devices can for example comprise a fluid-admitting duct 43 to admit a fluid under pressure (air for example), said duct being longitudinally formed through the first shaft 17 and being connected with a feeding source for said fluid under pressure arranged along the carcass-building line 12. In more detail, the admitting duct 43 of the first shaft 17 is preferably connected with said feeding source during a starting step of the tyre working cycle to set the inflatable bladder 14 to the inflated condition.

Preferably, during admission of fluid under pressure into the inflatable bladder 14 a control on the geometrical configuration of the bladder itself is carried out so as to operate interruption of said fluid admission when the bladder 14 has reached a predetermined size. More particularly, members (not shown in the drawings) adapted to detect the geometrical configuration of the inflatable bladder 14 can be provided for the purpose; said members for example comprise one or more photoemitters operating at different points of the extension outline of bladder 14 and each generating a light beam to be intercepted by the inflatable bladder when the inflated condition is reached. Combined with the photoemitters are respective photoreceivers set to receive the respective light beams directly coming from the photoemitters or reflected by the surface of the inflatable bladder 14 to operate interruption of fluid admission as soon as the light beam of the photoemitter is intercepted by the outer surface of the inflatable bladder. It is to be noted that with use of laser photoemitters a very precise control of the geometrical configuration of the inflatable bladder 14 can be obtained, even with tolerances of less than 0.1 mm.

On reaching the inflated condition, the inflatable bladder 14 is inflated to a pressure of a value that just as an indication is lower than 5 bars.

Due to the rigidity of the elastic return members 35, blocks 27 are maintained in a radially retracted position when the bladder is in an inflated condition.

Once the inflated condition of the inflatable bladder 14 has been reached, the building support 9 lends itself to receive the different constituent elements of the built carcass structure 3 that are assembled thereon in the different work steps along the carcass-building line 12.

In detail, in manufacturing each of the built carcass structures 3 along the carcass-building line 12 it is provided that at least part or all of the constituent elements 4, 4a, 5 should be made by directly applying on the building support 9, one or more elementary components, such as elongated elements or strips of elastomer material, rubberised metallic or textile cords, strip-like elements made of rubberised cords or other, as described in document U.S. Pat. No. 6,457,504 in the name of the same Applicant, for example.

More specifically, formation of the built carcass structure 3 can start with formation of the impermeable liner 4a through winding of a continuous strip of raw elastomer material into coils disposed consecutively close to each other starting from one of the annular abutment flanges 37, in the region corresponding to one of the tyre 2 beads, to cover the outer surface of the inflatable bladder 14 until the annular abutment flange 37 placed on the opposite side of the bladder itself is reached. Advantageously, the continuous strip can be supplied from an extruder directly onto the outer surface of the building support 9, while said support is supported, at one or both shafts 17, 18 for example, by one of the robotized arms 10 or other device adapted to drive it in rotation and conveniently move it in the vicinity of the extruder so as to obtain the desired coil distribution.

The carcass ply 4 can be advantageously formed with the aid of members adapted to lay a plurality of strip-like elements of rubberised cords in circumferential succession on the building support 9, each of said strip-like elements comprising textile or metallic cords parallel to each other, at least partly incorporated in a layer of elastomer material. During laying, the building support 9 can be supported, at one or both shafts 17, 18 for example, by one of the robotized arms 10 or other device adapted to drive it sequentially in rotation with a predetermined angular pitch, in accordance with the laying sequence of the strip-like elements of rubberised cords.

Formation of each annular anchoring structure 5a is then carried out close to the respective inner circumferential edge of the built carcass structure 3, through members designed to supply and apply, at the respective annular abutment flange 37, at least one rubberised metallic cord or other continuous elongated element resisting to tensile stresses.

Simultaneously, the building support 9 can be supported by one of the robotized arms 10 or other device suitable to drive it in rotation and conveniently move it close to the member supplying the continuous elongated element, so as to cause winding of the latter into coils radially superposed around the geometric axis of the building support itself.

As described above, tyre 2 also comprises the sidewalls 8 that, depending on the different embodiments, can have respective radially external end edges superposed on the side edges of the tread band, to form one design scheme of the type usually referred to as "overlying sidewalls", or interposed between the carcass structure and the side edges of the tread band, in accordance with a design scheme of the type referred to as "underlying sidewalls".

Generally, the sidewalls 8 are made through winding of at least one continuous strip of raw elastomer material into coils disposed consecutively close to each other and conveniently superposed to give each of the sidewalls the desired structural conformation.

According to the above mentioned "underlying sidewalls" design scheme, after manufacture of the sidewalls 8, the carcass structure 2 thus completed on the building support 9 lends itself to be coupled with the belt structure 6 made in the belt-manufacturing line 12b of the conventional type.

The belt structure 6 can be made for example, starting from one or more semifinished products in the form of a continuous tape coming from respective feeding lines 44a to be cut to size in accordance with the circumferential extension of the belt structure 6 to be made, and subsequently wound up on at least one collapsible drum 45 so that each will form a so-called belt layer. Alternatively, the belt structure 6 can be made by directly forming the semifinished products in the form of a tape having a desired length in the same belt-manufacturing line 12b carrying the collapsible drum 45, as described in document US-2002/062908 in the name of the same Applicant, for example.

Figure 3:
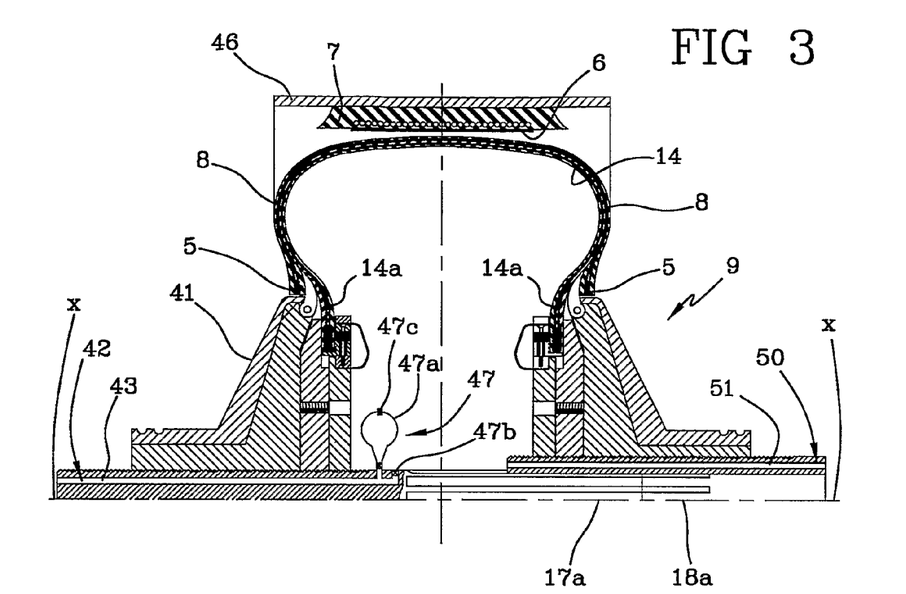
FIGS. 3 and 3a show a transfer device carrying a belt structure associated with a tread band and, respectively, a belt structure alone set coaxially around a carcass structure formed on the carcass-building support of FIG. 2.
Figure 3A:
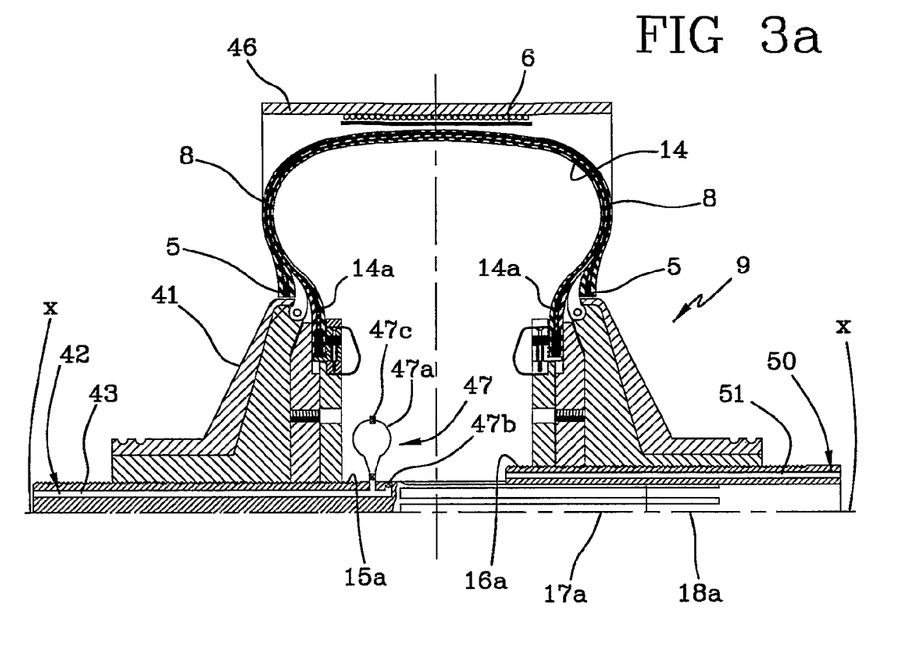

At least one transfer member diagrammatically denoted at 46 picks up the belt structure 6 from the respective collapsible drum 45 to arrange it, at the work station 111 of FIG. 1, in a coaxially centred position around the built carcass structure 3, formed on the inflatable bladder 14 under inflated conditions as shown in FIGS. 3 and 3a. A further transfer member 46 can be designed for transfer of the belt structures 6 from a respective collapsible drum 45 to the assembled carcass structures 3 obtained in the assembling line 12a. It is to be pointed out that positioning of the belt structure 6 around the built carcass structure 3 can be obtained through an axial movement of the transfer member 46 and/or of the building support 9 carried by one of the robotized arms 10.

As shown in FIGS. 3 and 3a, the built carcass structure 3 formed on the inflatable bladder 14 under inflated conditions has a maximum diameter suitably smaller than the inner diameter of the belt structure 6, so that it can be coaxially inserted thereinto without mechanical interferences.

Figure 4:
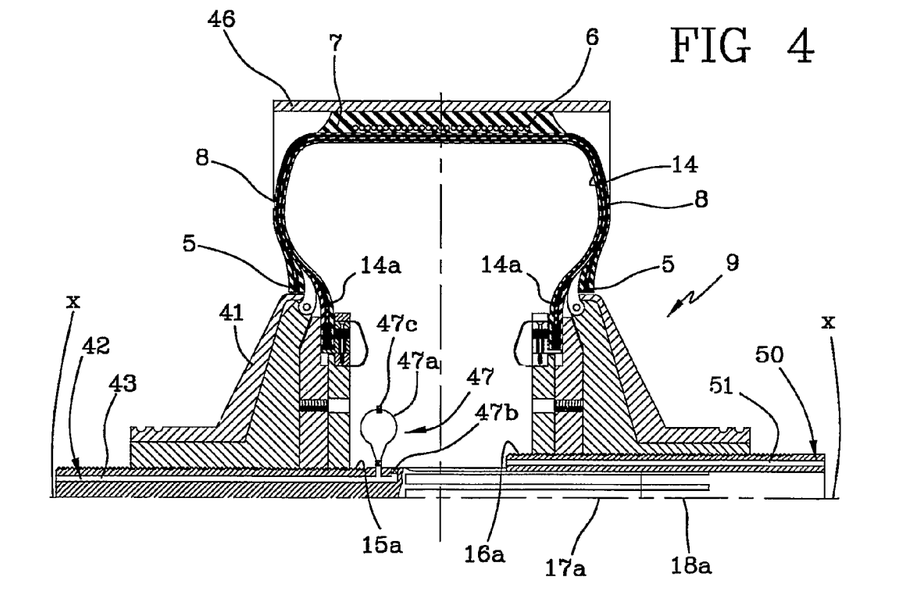
FIGS. 4 and 4a show the building support in FIG. 3 in a condition of radial expansion, to cause engagement between a built carcass structure and, respectively, the belt structure associated with the tread band and the belt structure alone carried by the transfer device.
Figure 4A:
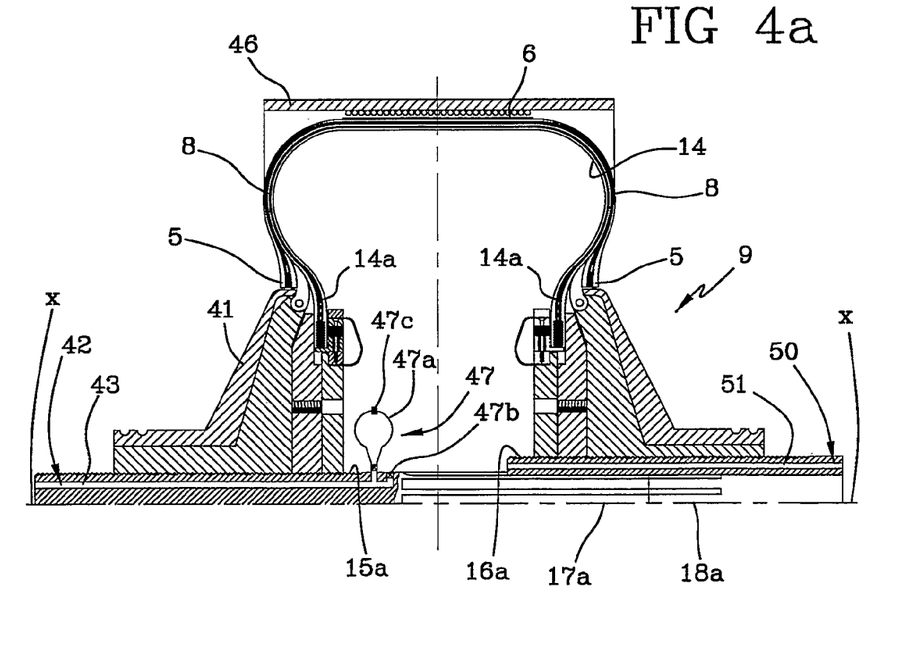

When positioning is over, as shown in FIGS. 4 and 4a, a step of radial expansion of the inflatable bladder 14 starting from the inflated condition is operated, so as to radially expand the built carcass structure 3 until bringing the carcass ply 4 into contact with the inner surface of the belt structure 6, held by the transfer member 46.

Shown in FIGS. 3 and 4 is the embodiment in which both the belt structure 6 (inclusive of the two crossed layers and the zero-degree layer) and the tread band 7 are manufactured in a conventional plant, i.e. in the belt-manufacturing line 12b and in a conventional tread band-production line (not shown in FIG. 1) and subsequently associated (see FIG. 4) with the built carcass structure 3 by use of the transfer member 46.

Alternatively, as shown in FIGS. 3a and 4a, the belt structure 6 alone (inclusive of the two crossed layers and the zero-degree layer) is made in a plant of the conventional type (i.e. in the belt-manufacturing line 12b), while the tread band 7 is subsequently obtained directly on the building support 9 provided with the inflatable bladder 14 in the work station 112 in FIG. 1.

According to a further embodiment (not shown) only the two crossed layers of the belt structure 6 are made in the belt-manufacturing line 12b, while the zero-degree layer of the belt structure (as well as the tread band) is obtained on the building support 9 provided with the inflatable bladder 14.

Radial expansion of the inflatable bladder 14 can be achieved following a controlled axial movement of the anchoring flanges 15, 16 and therefore of the circumferential edges of the inflatable bladder 14, away from or close to each other.

This movement can be executed by axial-movement devices for example, that are carried by the robotized arm 10 engaging the building support 9 and operate in such a manner as to rotate shafts 17, 18 firmly and jointly within the anchoring flanges 15, 16 themselves. The opposite threads engaging each of the shafts 17, 18 within the respective flanges cause, following the above-mentioned rotation, the desired mutual axial movement of the flanges themselves and, as a result, the radial expansion of the inflatable bladder 14 by effect of the inflating pressure of the latter. The axial movement of flanges 15, 16 can also be obtained through mutual axial sliding of the shafts 17. 18.

Alternatively, or in addition to the axial movement of the anchoring flanges 15, 16, the radial expansion of the inflatable bladder 14 can be carried out by further admission thereinto of fluid under pressure, through the inflating devices 42.

The structure of the anchoring flanges 15, 16 gives the inner circumferential edges 14a of the inflatable bladder 14 some mobility in a radial direction. Consequently, the circumferential edges 14a of the inflatable bladder 14 are free to move in a radial and a circumferential direction, dragging along the blocks 27 carrying out a radial translation away from axis X-X and compressing the elastic return members 35.

This mobility of the circumferential edges 14a of the inflatable bladder 14 can be advantageously utilised to help the radial expansion of said bladder. However, in a preferential solution, the inflating pressure of bladder 14 under radial-expansion conditions preferably keeps lower than about 5 bars or at all events within a value enabling the elastic return members 35 to maintain blocks 27 in a radially contracted position.

The radial expansion of the inflatable bladder 14 can be advantageously utilised to determine a pressing action of the belt structure 6 against the built carcass structure 3, then applied against the belt structure itself. The transfer member 46 can be subsequently disengaged from the belt structure 6 applied around the carcass structure 3. The pressing action for application purposes can be implemented by a rolling or brushing step, to be executed in a manner known by itself on the belt structure 6 after disengagement of the transfer member 46.

As above mentioned, applied to the belt structure 6, before or after application of said belt structure to the carcass structure 3, is the tread band 7 that can be made in the form of a semifinished product directly extruded based on the final geometrical and dimensional configuration of the tread band itself. Generally provided in this embodiment is a further step of rolling the tread band so that the latter is correctly associated with the underlying belt structure. Alternatively, the tread band 7 is formed by winding on the belt structure 6, a continuous elongated element of reduced sizes to form coils disposed close to each other and superposed until the desired geometrical and dimensional configuration is given to the tread band 7.

According to the previously mentioned design scheme providing "overlying sidewalls", generally a first portion of the sidewalls 8 is applied at the beads 5 of tyre 2 during manufacture of the carcass structure 3. A second portion of the sidewalls 8 is subsequently applied in a step following arrangement of the tread band 7 so that the radially external end edges of said second portion are superimposed on the side edges of the tread band. Preferably, the elastomer material of said second portion has a lower hardness than the elastomer material of said first portion.

Advantageously, during assembling of the different components of tyre 2, and in particular during manufacture of the built carcass structure 3, a control of the inner pressure of the inflatable bladder 14 may be provided to be carried out continuously or at predetermined intervals. In fact the Applicant has found that this inner pressure can be submitted to important variations, due to temperature increases or falls taking place during working, with consequent repercussions on the geometrical conformation of the inflatable bladder 14 in an inflated state. For the purpose, devices 47 for control and maintenance of the inflating pressure in the inflatable bladder 14 are provided which preferably comprise a pneumatic tank 47a (diagrammatically shown) associated with the first shaft 17 for example and connected with the fluid-admitting duct 43, so that it can be filled with the fluid under pressure concurrently with inflation of bladder 14. Combined with the pneumatic tank 46a are control members consisting of a manometric sensor 47b for example, that is connected to an on-off valve 47b set on the tank itself to control admission of fluid under pressure into the inflatable bladder 14 should the inner pressure of said bladder fall under a predetermined value. The manometric sensor 47b can also command opening of a discharge valve 48 associated with an outflow duct 49 discharging the fluid under pressure from the inflatable bladder 14, to determine evacuation of the fluid under pressure should the inner pressure of bladder 14 go up beyond a predetermined threshold during manufacturing of tyre 2.

When manufacture has been completed, the building support 9 with the green tyre 2 formed thereon is transferred into one of the vulcanisation moulds 13 provided in the vulcanisation and moulding station 113 of FIG. 1, wherein activation of over-inflating devices 50 is operated, upon the action of which devices a further expansion of the inflatable bladder is determined starting from the radial-expansion condition.

These over-inflating devices 50 can be coincident with, or form an integral part of the above described inflating devices 42 and can comprise an admission channel 51 and an evacuation channel 52 for a fluid under pressure for example, which channels are longitudinally arranged in the second shaft 18 and can be connected with a circuit for feeding steam or other vulcanisation fluid usually associated with the mould 13. Through the admission 51 and evacuation 52 channels, circulation of steam within the building support 9 is therefore enabled at pressure values even higher than 20 bars, considerably higher than those generated to bring and maintain the bladder 14 to the inflated condition in the preceding tyre 2 manufacturing steps.

Figure 6:
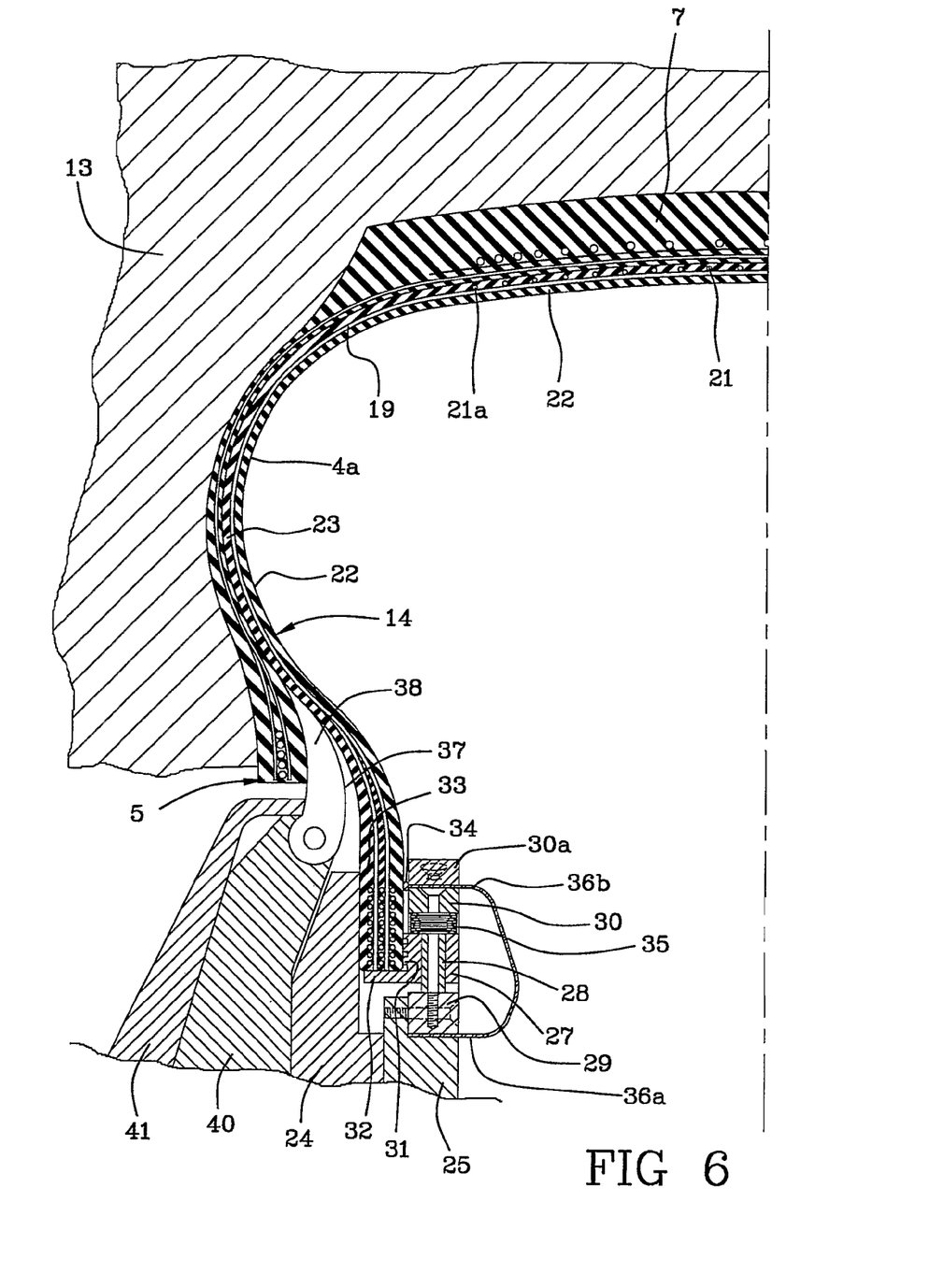
FIG. 6 shows the detail in FIG. 5, with the carcass-building support in an over-inflated condition.

The high pressure of the steam admitted into the inflatable bladder 14 therefore gives rise to over-inflation with further expansion so as to ensure compression of tyre 2 against the inner walls of mould 13.

Under this circumstance, the inner pressure of the inflatable bladder 14 is capable of overcoming the action exerted by the elastic return members 35. Consequently, the circumferential edges 14a of the inflatable bladder 14 move in a radial and circumferential direction, dragging along blocks 27 that carry out a radial translation away from axis X-X and compress the elastic return members 35, to help expansion of the bladder during the over-inflation step. Preferably, for reaching the over-inflation condition the inner circumferential edges are submitted to an expansion of at least 2% in a circumferential direction.

When vulcanisation has been completed, the steam under pressure is ejected from the inflatable bladder 14 through the evacuation channel 52 and, due to pressure reduction, the elastic return members 35 bring blocks 27 back to the first operating condition, causing separation of the inflatable bladder 14 from the inner surfaces of tyre 2.

Figure 7:
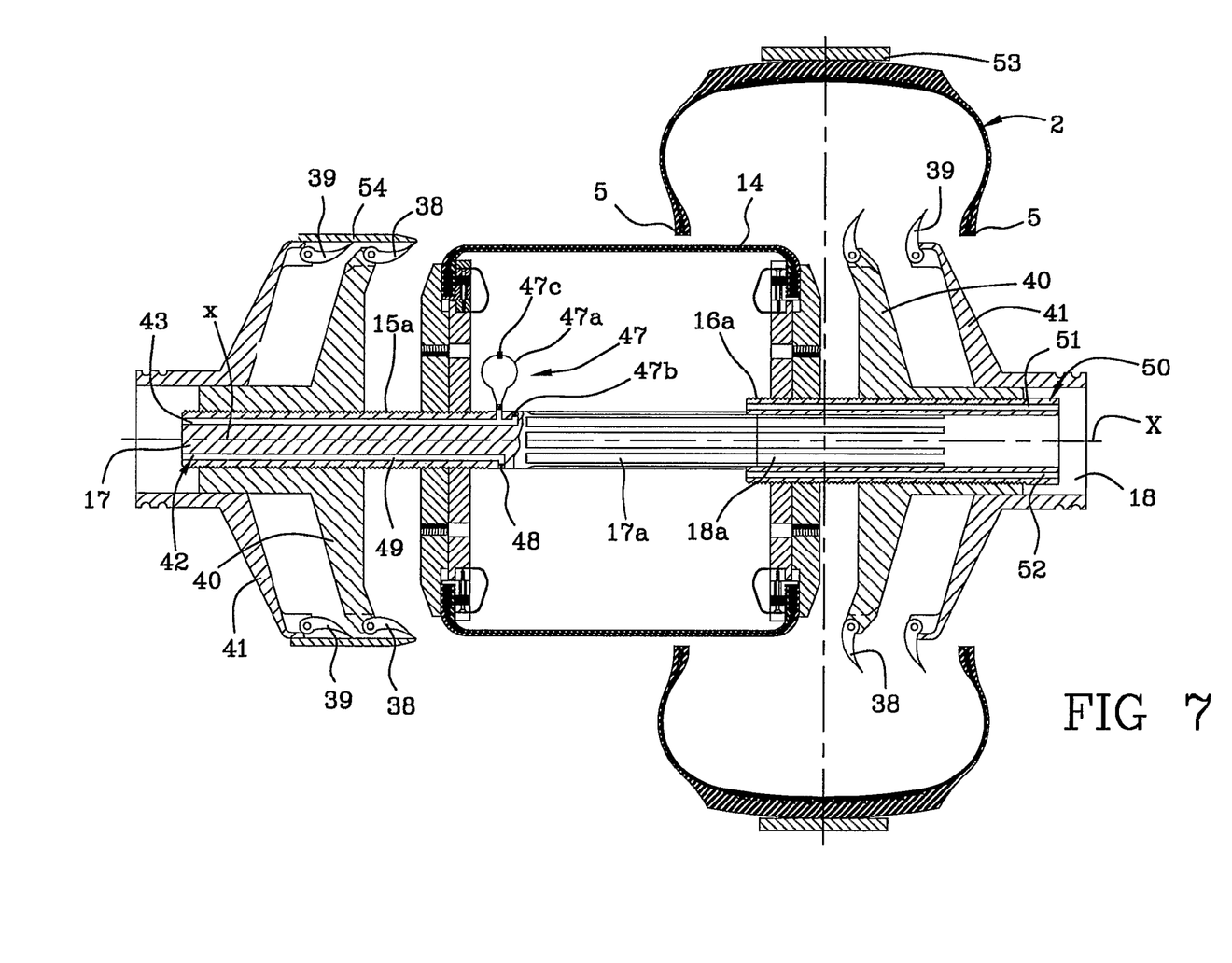
FIG. 7 shows the carcass-building support during removal of the finished tyre.

In the work station 114, the building support 9 with the finished tyre 2 are extracted from mould 13 to be subsequently separated from each other. For the purpose, the first and second shafts 17, 18 are mutually disengaged and, while tyre 2 is externally retained by a handler 53, a mutual approaching of the anchoring flanges 15, 16 can be carried out to cause separation of beads 5 from the circumferential abutment flanges 37. Afterwards, axial movement of the second hubs 41 away from the first hubs 40 is caused, so that the second circumferential sectors 39 are free to take an orientation towards the rest condition without mechanically interfering with the first circumferential sectors 38. During this axial-movement step the second circumferential sectors 39 carried by at least one of the second hubs 41, the one associated with the first shaft 17 for example, are forced to pass at the inside of the corresponding bead 5 of tyre 2, concurrently with their reaching a rest condition.

Subsequently, axial moving of the anchoring flanges 15, 16 away from each other is driven, so that passage of the first circumferential sectors 38 of at least one of the first hubs 40, the one associated with the first shaft 17 for example, at the inside of the bead of tyre 2 is caused. Tyre 2, through handler 53, lends itself to be axially slipped off through one of the anchoring flanges 15, 16, the flange 15 associated with the first shaft 17 for example, as well as from the respective hubs 40, 41. A holding ring 54 can be advantageously fitted on the axially spaced apart hubs 40, 41 associated with the first shaft 17, to maintain the circumferential sectors 38, 39 in the rest position.

It is to be noted that removal of tyre 2 from the building support 9 can be possibly carried out before vulcanisation so that the last-mentioned operation can be performed in a conventional vulcanising unit to be also used for vulcanisation of the tyre manufactured along the assembling line 12a.

The original utilisation of the inflatable bladder 14 in accordance with the invention enables manufacture of tyres through formation of the constituent elements of the carcass structure 3 by laying of elementary components on the building support 9 and accomplishment of the belt structure 6—and possibly the tread band 7—in production lines of the traditional type, i.e. operating on semifinished products.

Integrating a carcass-building line 12 for manufacture of the carcass structures by means of elementary components, with a conventional assembling line 12a also enables the production flexibility of the plant to be greatly increased, due to the possibility of obtaining, on the building line 12, carcass structures having construction standards different from each other and/or from those of the carcass structures produced along the assembling line 12a.

The process in accordance with the present invention in addition achieves the advantage that the final diameter when the belt structure is laid on the underlying carcass structure is without doubt the desired one and the one calculated during the planning step. In fact, in accordance with the invention, the belt structure is advantageously obtained by laying said structure on a cylindrical drum (the collapsible drum 45), instead of laying it on a building support comprising an inflatable bladder. In addition, the final diameter of the belt structure is ensured by the predetermined height of the transfer member 46; in fact, expansion of the inflatable bladder 14 supporting the carcass structure is regulated in such a manner that coupling between the belt structure retained by the transfer member 46 and the carcass structure associated with said inflatable bladder 14 is allowed. An advantage therefore exists in terms of quality of the produced tyre, particularly as regards evenness of same.

A further advantage resulting from the process in accordance with the present invention resides in that use of manufacturing lines of a conventional type to make the belt structures allows arrangement, if required, of encircling elongated elements of elastomer material disposed at the circumferential edges of the crossed belt layers to surround said edges. These elongated elements are sometimes used to protect the integrity of the tyre at the axial ends of said belt layers so as to prevent the end portions of the metallic cords present in said belt layers from irreparably damaging the tyre structure at the tyre sidewalls.

As above pointed out, a further advantage achieved with the process of the invention is the possibility of applying to the carcass structure, a belt structure and possibly a tread band previously formed, avoiding the inflatable bladder and the manufactured article supported thereby being submitted to undesirable stresses that, on the contrary, would take place should the belt structure be manufactured through laying of the elementary components directly on the carcass structure supported on the inflatable bladder of the building support. Therefore, the process in accordance with the invention makes it possible and convenient to use an inflatable bladder having a simplified structure.

In addition, since the building support comprising the inflatable bladder enables the green tyre to be disengaged from the support itself in a sufficiently easy manner, in the process in accordance with the invention the vulcanisation step can be conducted in a conventional manner, i.e. without introducing said support into the vulcanisation mould.

Other advantages are also achieved in terms of improvement of the moulding conditions of tyre 2 and, consequently, of the quality of the finished product. In fact, due to the mobility of the inner circumferential edges 14a of bladder 14 in a radial direction, an optimal expansion of the bladder itself in the over-inflated condition is ensured and, as a result, a better evenness when tyre 2 is pressed against the walls of mould 13.

Achievement of the above advantages is also helped by the construction features of the inflatable bladder 14 and in particular by the expandability of the circumferential edges 14a of said bladder in a circumferential direction.

The mobility of the circumferential edges 14a greatly reduces the stresses to which the inflatable bladder 14 as a whole is submitted during the radial expansion and/or over-inflation steps. Thus a longer duration of the inflatable bladder 14 is ensured and the frequency of interventions for maintenance on the building support 9 is reduced.

It will be also recognised that the inflation control through control of the geometrical configuration of bladder 14 offers a better control of the geometrical uniformity of the obtained product. The fact that the inner pressure of the bladder, when inflation has been completed, is controlled and maintained during execution of the whole process for manufacturing tyre 2 also helps in reaching the above improvement.

The possibility of axially positioning the anchoring flanges 15, 16 along the respective first and second shafts 17, 18 also allows the building support 9 to be adapted to production of tyres of different sizes.

The invention claimed is:

1. An apparatus for manufacturing tyres, comprising:
a building support comprising an inflatable bladder having coaxially spaced apart circumferential edges and axially opposite anchoring flanges engaging the circumferential edges of the inflatable bladder, wherein each circumferential edge of the inflatable bladder is slidably engaged with a radial abutment surface defined in a respective one of the anchoring flanges so that each circumferential edge of the inflatable bladder is movable in a radial direction while in anchoring engagement with a respective one of the anchoring flanges;
inflating devices associated with the inflatable bladder to bring said bladder to an inflated condition so that said bladder has a substantially toroidal shape with an outer surface thereof conforming in shape to the inner surface of a carcass structure of a tyre;
devices for forming the carcass structure by laying elementary components of said carcass structure on the building support; and
devices for applying an annular belt structure to the carcass structure at a radially external position,
said devices for applying the belt structure comprising:
positioning devices operating on the belt structure to support said belt structure at a coaxially centered position around the carcass structure formed on the building support; and
devices for expanding the inflatable bladder from the inflated condition at which the carcass structure formed thereon has a maximum diameter smaller than an inner diameter of the belt structure to a radial-expansion condition at which the carcass structure is applied against the belt structure.

2. The apparatus as claimed in claim 1, wherein the devices for expanding the inflatable bladder comprise members for axial movement of the anchoring flanges.

3. The apparatus as claimed in claim 2, wherein said members for axial movement comprise a first shaft and a second shaft to be telescopically engaged into each other and carrying the anchoring flanges, respectively.

4. The apparatus as claimed in claim 3, wherein the anchoring flanges are engaged on the first and second shafts by means of first and second threads, respectively, having opposite screwing directions, said axial-movement members comprising devices for driving the shafts in rotation relative to the anchoring flanges.

5. The apparatus as claimed in claim 3, wherein the inflating devices comprise at least one pneumatic admission duct formed in at least one of said first shaft and second shaft.

6. The apparatus as claimed in claim 1, wherein the devices for expanding the inflatable bladder comprise command members operating on the inflating devices to enable admission of fluid under pressure into the inflatable bladder in an inflated condition.

7. The apparatus as claimed in claim 1, wherein radial-sliding members associated with said anchoring flanges allow radial movement of the circumferential edges of the inflatable bladder.

8. The apparatus as claimed in claim 7, wherein the radial-sliding members comprise, for each anchoring flange, a plurality of circumferentially-distributed blocks that are slidably guided in a substantially radial direction on the anchoring flange and rigidly engage the corresponding circumferential edge of the inflatable bladder.

9. The apparatus as claimed in claim 8, comprising elastic return members, operating on the blocks to push them against a geometrical axis of the inflatable bladder.

10. The apparatus as claimed in claim 8, wherein each circumferential edge of the inflatable bladder is enclosed between said blocks and the radial abutment surface defined in the anchoring flange.

11. The apparatus as claimed in claim 10, wherein the inflatable bladder is slidably and sealingly engaged against the radial abutment surface.

12. The apparatus as claimed in claim 7, wherein at least one circumferential seal acting against the inflatable bladder is associated with each anchoring flange at a radially external position relative to the radial-sliding members.

13. The apparatus as claimed in claim 8, wherein associated with each anchoring flange is at least one annular membrane having a radially internal circumferential edge sealingly fastened to the anchoring flange at a radially internal position relative to the radial-sliding members and a radially external circumferential edge sealingly fastened to the anchoring flange at a radially external position relative to the radial-sliding members.

14. The apparatus as claimed in claim 1, further comprising devices for control and maintenance of the inflating pressure of the inflatable bladder during assembling of the components of the carcass structure on the building support.

15. The apparatus as claimed in claim 14, wherein said devices for control and maintenance of the inflating pressure comprise a pneumatic tank associated with the building support and control members interconnected with said tank to keep a constant control of the inflating pressure of the inflatable bladder in the inflated condition.

16. The apparatus as claimed in claim 1, further comprising two annular flanges to be positioned at respectively opposite positions against the outer side surfaces of the inflatable bladder and each defining a rigid abutment surface for formation of a bead of the tyre under working.

17. An apparatus as claimed in claim 16, wherein each annular flange comprises circumferential sectors that are movable between an operating position at which they have an orientation substantially radial to a geometric axis of the inflatable bladder and a rest position at which they are radially retracted to enable disengagement of the tyre from the building support.

18. The apparatus as claimed in claim 17, wherein each annular flange comprises first sectors and second sectors that are circumferentially distributed in an alternated sequence and are in engagement with a first hub and a second hub respectively, which are axially movable with respect to each other.

19. An apparatus as claimed in claim 1, wherein associated with said inflating devices are members for detecting the geometrical configuration of the inflatable chamber in order to interrupt admission of fluid under pressure when the inflatable bladder has reached predetermined sizes.

20. The apparatus as claimed in claim 19, wherein said detecting members comprise at least one photoemitter generating a light beam to be Intercepted by the inflatable bladder in an inflated condition and a photoreceiver set to receive the light beam.

21. The apparatus as claimed in claim 1, wherein the devices for forming the carcass structure comprise members for laying strip-like elements of rubberised cords on the building support in a circumferential sequence, so as to form at least one carcass ply.

22. The apparatus as claimed in claim 1, wherein the devices for forming the carcass structure comprise members for application of at least one continuous elongated element resistant to tensile strength in the form of coils radially superimposed around a geometric rotation axis of the building support to form an annular anchoring structure in the vicinity of an inner circumferential edge of the carcass structure.

23. The apparatus as claimed in claim 1, further comprising a vulcanisation and moulding station for the obtained tyres.

24. The apparatus as claimed in claim 23, wherein said vulcanisation and moulding station comprises:
    a tyre vulcanisation mould;
    devices for transferring the building support into the vulcanisation mould; and
    devices for over-inflation of the inflatable bladder, which operate in said vulcanisation mould and are adapted to be started in order to impose an additional radial expansion to the inflatable bladder, starting from the radial-expansion condition.

25. The apparatus as claimed in claim 1, further comprising devices for application of elongated reinforcing inserts extending into circumferential coils disposed axially close to each other, around the annular belt structure carried by the carcass structure.

26. The apparatus as claimed in claim 1, further comprising a work station to apply a tread band to said annular belt structure at a radially external position.

27. The apparatus as claimed in claim 26, wherein said work station comprises devices for forming the tread band by winding a semifinished product of elastomer material around the belt structure, said product being substantially the same width as the tread band.

28. A method of manufacturing tyres through use of a building support having an inflatable bladder with coaxially spaced apart circumferential edges and axially opposite anchoring flanges engaging the circumferential edges of the inflatable bladder, comprising the steps of:
    setting the inflatable bladder to an inflated condition so that an outer surface thereof conforms in shape to the inner surface of a carcass structure of a tyre, wherein each circumferential edge of the inflatable bladder is slidably engaged with a radial abutment surface defined in a respective one of the anchoring flanges so that each circumferential edge of the inflatable bladder is movable in a radial direction while in anchoring engagement with a respective one of the anchoring flanges;
    applying a plurality of elementary components onto the building support so as to form the carcass structure; and
    applying an annular belt structure to the carcass structure at a radially external position, wherein application of the belt structure comprises the steps of:
    making the belt structure;
    arranging the belt structure at a coaxially centered position relative to the carcass structure formed on the inflatable bladder; and
    radially expanding the inflatable bladder to a radially-expanded condition to apply the carcass structure against the belt structure.

29. The method as claimed in claim 28, wherein radial expansion of the inflatable bladder is carried out through mutual axial movement of the axially spaced apart circumferential edges of the inflatable bladder itself.

30. The method as claimed in claim 28, wherein radial expansion of the inflatable bladder is carried out through admission thereinto of a fluid under pressure.

31. The method as claimed in claim 29, wherein during the radial expansion the circumferential edges of the inflatable bladder are submitted to a radial outward movement.

32. The method as claimed in claim 31, wherein in the translation between the inflated condition and the radially-expanded condition, each circumferential edge of the inflatable bladder is slidably and sealingly guided in an anchoring flange associated with said building support.

33. The method as claimed in claim 28, further comprising a step of pressing the belt structure against the carcass structure.

34. The method as claimed in claim 33, wherein said pressing step is carried out concurrently with said radial-expansion step.

35. The method as claimed in claim 33, wherein said pressing step is carried out by exerting a rolling or brushing action on the belt structure.

36. The method as claimed in claim 28, wherein arrangement of the bladder in the inflated condition is carried out by admission of a fluid under pressure into the inflatable bladder, said method further comprising the step of controlling the geometrical configuration of the inflatable bladder.

37. The method as claimed in claim 36, wherein control of the geometrical configuration of the inflatable bladder is carried out by detecting the interception of at least one light beam by the inflatable bladder when the latter reaches the inflated condition.

38. The method as claimed in claim 28, wherein, during the step of assembling the elementary components of the carcass structure on the building support, at least control of the inflating pressure of the inflatable bladder is carried out.

39. The method as claimed in claim 28, further comprising the step of associating a tread band with said annular belt structure at a radially external position.

40. The method as claimed in claim 39, wherein the step of associating the tread band is carried out by:
   forming of an elastomer semifinished product having the same width as the tread band; and
   winding said semifinished product around the belt structure.

41. The method as claimed in claim 39, wherein the step of associating the tread band is carried out before application of the belt structure onto the carcass structure.

42. The method as claimed in claim 39, wherein the step of associating the tread band is carried out after application of the belt structure onto the carcass structure.

43. The method as claimed in claim 28, further comprising the step of vulcanising and moulding the obtained tyre.

44. The method as claimed in claim 43, wherein the vulcanisation and moulding step of each tyre manufactured on the building support comprises the steps of:
   removing a green tyre from the building support; and
   introducing the green tyre into a vulcanisation mould.

45. The method as claimed in claim 43, wherein the vulcanisation and moulding step of each tyre manufactured on the building support comprises the steps of:
   introducing a green tyre and the building support into a vulcanisation mould; and
   carrying out an over-inflation of the inflatable bladder during the vulcanisation and moulding step.

46. The method as claimed in claim 45, wherein during the over-inflation step, the circumferential edges of the inflatable bladder are submitted to a radial outward movement.

47. The method as claimed in claim 44, further comprising a step of deflating the inflatable bladder to enable disengagement of the building support from the tyre.

48. The method as claimed in claim 28, further comprising the step of laterally moving a pair of annular abutment flanges close to the inflatable bladder, said flanges defining rest seats for respective beads of the tyre being worked.

49. The method as claimed in claim 28, wherein formation of the carcass structure comprises at least one step of forming a carcass ply by laying strip-like elements made of rubberised cords in a circumferential succession on the building support.

50. The method as claimed in claim 28, wherein formation of the carcass structure comprises at least one step of forming an annular anchoring structure close to an inner circumferential edge of the carcass structure by winding of a continuous elongated element into radially superposed coils.

* * * * *